United States Patent
Min et al.

(10) Patent No.: US 7,136,432 B2
(45) Date of Patent: Nov. 14, 2006

(54) ROBUST BURST DETECTION AND ACQUISITION SYSTEM AND METHOD

(75) Inventors: Jonathan S. Min, Buena Park, CA (US); Fang Lu, Irvine, CA (US); Bruce J. Currivan, Irvine, CA (US); Tom Kwon, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 669 days.

(21) Appl. No.: 10/163,309

(22) Filed: Jun. 7, 2002

(65) Prior Publication Data

US 2003/0021365 A1   Jan. 30, 2003

Related U.S. Application Data

(60) Provisional application No. 60/296,450, filed on Jun. 8, 2001, provisional application No. 60/296,445, filed on Jun. 8, 2001.

(51) Int. Cl.
  *H04L 27/14* (2006.01)
(52) U.S. Cl. .................. 375/326; 375/232; 375/316
(58) Field of Classification Search ............... 375/340, 375/231, 348, 261, 232, 324, 326, 316, 332, 375/371, 229, 220, 260, 346, 368, 362; 370/465, 370/207, 485, 208, 210, 443; 348/469, 473; 708/403, 404
See application file for complete search history.

(56) References Cited

U.S. PATENT DOCUMENTS

| | | | | |
|---|---|---|---|---|
| 4,621,365 A | | 11/1986 | Chiu | |
| 5,272,446 A | * | 12/1993 | Chalmers et al. | 329/304 |
| 5,561,468 A | * | 10/1996 | Bryan et al. | 348/469 |
| 5,606,580 A | * | 2/1997 | Mourot et al. | 375/340 |
| 5,889,765 A | | 3/1999 | Gibbs | 370/294 |
| 5,898,684 A | | 4/1999 | Currivan et al. | |
| 5,970,092 A | * | 10/1999 | Currivan | 375/232 |
| 6,075,972 A | | 6/2000 | Laubach et al. | 455/5.1 |
| 6,078,607 A | | 6/2000 | Monroe et al. | |
| 6,115,433 A | * | 9/2000 | de Lantremange | 375/326 |
| 6,134,286 A | | 10/2000 | Chennakeshu et al. | |
| 6,236,678 B1 | | 5/2001 | Horton, Jr. et al. | 375/222 |
| 6,363,107 B1 | | 3/2002 | Scott | |
| 6,584,147 B1 | * | 6/2003 | Schaumont et al. | 375/220 |
| 6,680,901 B1 | * | 1/2004 | Yamamoto et al. | 370/208 |
| 6,735,221 B1 | * | 5/2004 | Cherubini | 370/485 |
| 2002/0126748 A1 | * | 9/2002 | Rafie et al. | 375/229 |

OTHER PUBLICATIONS

Copy of International Search Report for Appln. No. PCT/US02/17865, issued Dec. 23, 2002, 6 pages.

\* cited by examiner

*Primary Examiner*—Temesghen Ghebretinsae
(74) *Attorney, Agent, or Firm*—Sterne, Kessler, Goldstein & Fox, P.L.L.C.

(57) ABSTRACT

A method of parameter estimation in a shared channel communications system includes the steps of receiving a preamble including a first sequence corresponding to a sequence having zero autocorrelation, a second sequence having zero autocorrelation, and a third sequence having zero autocorrelation, performing a coarse carrier frequency estimate based on the first sequence, and performing a fine carrier frequency estimate based on the second and third sequences.

23 Claims, 14 Drawing Sheets

| Freq. Error | Gain Error | Est. Gain | Correction Factor |
|---|---|---|---|
| 0% | 0 dB | 1.00 | 1.0 |
| 0.5% | 0.12 dB | 1.0137 | 0.9865 |
| 1% | 0.4 dB | 1.05 | 0.9554 |
| 1.5% | 0.87 dB | 1.105 | 0.905 |
| 2% | 1.55 dB | 1.195 | 0.837 |
| 2.5% | 2.45 dB | 1.33 | 0.754 |
| 3% | 3.62 dB | 1.52 | 0.659 |

FIG.14

ROBUST BURST DETECTION AND ACQUISITION SYSTEM AND METHOD

CROSS-REFERENCE TO RELATED APPLICATIONS

This application claims priority to U.S. Provisional Patent Application No. 60/296,450, filed on Jun. 8, 2001, entitled "ROBUST BURST DETECTION ACQUISITION SYSTEM AND METHOD," to U.S. Provisional Patent Application No. 60/296,445, filed on Jun. 8, 2001, entitled "RECEIVER HAVING INTEGRATED SPECTRAL ANALYSIS CAPABILITY," and is related to U.S. patent application Ser. No. 10/164,355, filed on Jun. 7, 2002, entitled "RECEIVER HAVING INTEGRATED SPECTRAL ANALYSIS CAPABILITY", and U.S. patent application Ser. No. 09/430,821, filed on Oct. 29, 1999, entitled "BURST RECEIVER SYSTEM", all of which are incorporated herein by reference.

BACKGROUND OF THE INVENTION

1. Field of the Invention

The present invention relates to a burst demodulator for use in a high speed bidirectional digital transmission of voice, video, and data, and more particularly, to a robust TDMA burst receiver and a method for reliably detecting a preamble.

2. Related Art

Modern two-way communication for cable television, hybrid fiber/coax systems, wireless local multipoint distribution systems, and microwave multipoint distribution systems use time division multiple access (TDMA) to carry short burst transmissions in an upstream direction (return path) from multiple subscribers to a headend receiver. FIG. 1 shows an example of a TDMA time slot. In general the return path transmission characteristics, power level, and the clock offset from each subscriber will be different, thereby requiring the headend receiver to re-synchronize to each of the TDMA bursts. In order to minimize overhead time, it is desirable that the TDMA burst receiver be capable of reliably recognizing and synchronizing the preamble in as short a time as possible.

Existing TDMA burst receivers recognize and synchronize to a TDMA burst by correlating a preamble received at the beginning of the burst to an internal representation of the preamble stored in the TDMA burst receiver. A complication in the recognition and synchronization of the preamble is that a high power level of the TDMA burst transmission may cause the TDMA receiver to mistake a sidelobe peak of the autocorrelation of the preamble for the main peak. A further complication is that message data from the subscriber may have the same or nearly the same symbol pattern as the preamble. Yet a further complication is that narrowband noise or ingress may partially mask or emulate the TDMA burst transmission or be so large that its correlation to the preamble is as great as the main peak. A traditional solution to these complexities is to use a long preamble sequence of a few hundred symbols or more. However, such a long preamble sequence increases the time overhead of a system and is uneconomical for a system having data messages of less than a few thousand symbols.

Robust burst detection of high-order constellation modulation formats (e.g., 256-QAM), in presence of large carrier frequency offset, large dynamic range, and severe channel impairments such as narrow-band interferers, poses serious challenges. A typical burst receiver may only deal with a subset of these issues.

Accordingly, a need exists for robust burst detection using only minimum number of preamble symbols.

SUMMARY OF THE INVENTION

The present invention is directed to a robust burst detection and acquisition method and system in a burst communication system that substantially obviates one or more of the problems and disadvantages of the related art.

One advantage of the present invention is being able to utilize relatively short preamble sequences for burst parameter estimation.

Another advantage of the present invention is being able to use higher order QAM modulation schemes.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is provided a method of parameter estimation in a shared channel communications system comprising the steps of receiving a preamble comprising first, second and third sequences corresponding to sequences having zero autocorrelation, performing a coarse carrier frequency estimate based on the first sequence, and performing a fine carrier frequency estimate based on the second and third sequences.

In another aspect of the present invention there is provided a method of ranging in a shared channel communications system comprising the steps of receiving a ranging preamble comprising a first near-CAZAC sequence followed by second and third sequences whose derivatives correspond to CAZAC sequences, performing a coarse carrier frequency estimate based on the first sequence, and performing a fine carrier frequency estimate based on the second and third sequences.

In another aspect of the present invention there is provided a method of tracking data in a shared channel communications system comprising the steps of receiving a ranging preamble, performing a coarse carrier frequency estimate based on the ranging preamble, performing a fine carrier frequency estimate based on the ranging preamble, estimating gain based on the fine carrier frequency estimate, receiving a burst including a burst preamble and data, and correcting the gain based on tracking the data.

In another aspect of the present invention there is provided a method of receiving data in a shared channel communications system including the steps of receiving a burst including a preamble and data, performing a carrier frequency estimate and a gain estimate based on the preamble, tracking the burst with an equalizer, adjusting the gain estimate based on at least a main tap coefficient of the equalizer, wherein the equalizer uses at least a portion of the data to derive the main tap coefficient, and extracting symbols from the data.

In another aspect of the present invention there is provided a system for ranging a receiver in a shared communications channel comprising a filter that receives a signal from the shared communications channel, the signal including a ranging preamble that has a first sequence whose derivative is a zero autocorrelation sequence, and second and third sequences corresponding to a truncated first sequence, and outputs Nyquist samples, a preamble processor/ranging subsystem that receives the Nyquist samples from the filter, provides a coarse carrier frequency estimate based on the first sequence, and refines the coarse carrier frequency estimate based on the second and third sequences to provide a fine carrier frequency estimate, and a tracking subsystem that extracts data from the signal based on the fine carrier frequency estimate from the preamble processor/ranging system.

In another aspect of the present invention there is provided a system for parameter estimation in a shared channel communications system comprising means for receiving a preamble comprising a first sequence corresponding to a sequence having zero autocorrelation, and second and third sequences corresponding to a truncated first sequence, means for performing a coarse carrier frequency estimate based on the first sequence, and means for performing a fine carrier frequency estimate based on the second and third sequences.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute apart of this specification, illustrate embodiments of the invention and together with the description serve to explain the principles of the invention. In the drawings:

FIG. 14 illustrates a look up table for gain correction used in an embodiment of the present invention.

DETAILED DESCRIPTION OF THE INVENTION

Figure 1:
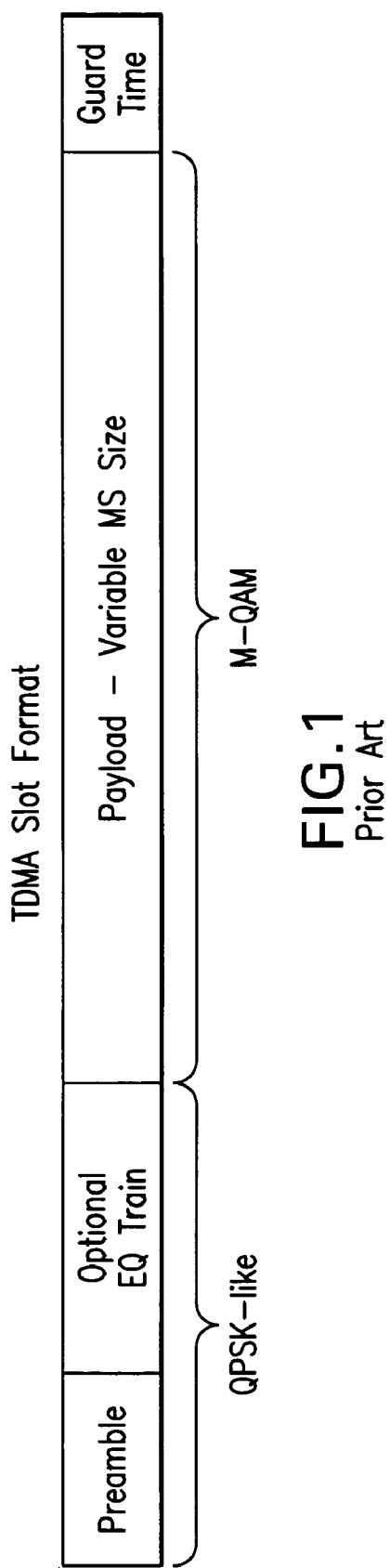
FIG. 1 illustrates a typical TDMA time slot.

Reference will now be made in detail to the embodiments of the present invention, examples of which are illustrated in the accompanying drawings.

This invention relates to a communication system where many users are shared. In one embodiment, it relates to a time division multiple access (TDMA) communication system. In a TDMA system such as a DOCSIS (Data-Over-Cable Service Interface Specifications) based cable network in the upstream communication, one needs a burst receiver which can detect packets from different subscribers. It will be appreciated that the invention is also applicable to other modulation schemes, such as FDMA, CDMA or SCDMA, although the description that follows is primarily done in terms of TDMA.

Typical thermal noise, as well as other factors result in detector and symbol processor imperfections. If the only inaccuracies present in the system were due to thermal noise, the signal-to-noise ratio of such a system would be approximately 30 dB which would allow the use of 256-QAM modulation. However, practical systems normally operate at much lower order QAM, for example 16-QAM, due to an inability to accurately estimate the relevant parameters. The parameters of primary interest are carrier frequency, carrier phase, gain, and symbol timing. Taking a real 16-QAM system as an example, carrier phase may be approximately 20 MHz. Carrier phase error of 5 degrees would be noticeable for 16-QAM modulation. ¼ dB to ½ dB gain error is noticeable for 16-QAM, as would 5–10% error of a symbol timing window. With regard to symbol rate, for 5.12 megasymbols per second, a 1% error rate corresponds to 50 KHz. Thus, if carrier frequency is off by 50 KHz, the receiver will begin to have problems distinguishing the symbols. Thus, any mechanism that allows for a more precise estimation of parameters allows for a system that performs much closer to the theoretical limit, allowing in turn an increase in data rate transmission.

Autocorrelation is a measure of the randomness of a signal. A CAZAC (constant amplitude zero autocorrelation) sequence has a frequency spectrum comprised of constant-amplitude components that extends over the entire bandwidth of the transmission channel. A large body of literature is generally available on the subject of CAZAC sequences. For background, the reader is generally referred to, for example, U.S. Pat. No. 4,089,061, as well as to standard texts on digital communications and signal processing. Below is a brief summary of CAZAC sequence properties and derivation.

CAZAC sequences may be derived from binary pseudo-random sequences exhibiting a property P1.

$\{a_i\}$ will designate a binary pseudo-random sequence of period or length L: $\{a_i\}=\{a_L\}=a_0\ a_1\ a_2\ \ldots\ a_{L-1}$, where the elements $a_i$ are equal to $\pm 1$. The autocorrelation matrix of this sequence is:

$$\begin{bmatrix} A_0 & A_1 & \ldots & A_{L-1} \\ A_1 & A_0 & \ldots & A_{L-2} \\ \vdots & & & \\ A_{L-1} & & \ldots & A_0 \end{bmatrix}$$

where $A_g$ is the $g^{th}$ coefficient of the periodic autocorrelation function:

$$A_g = \sum_{i=0}^{L-1} a_i a_{i+g}$$

for g=0, 1, ..., (L−1).

All sequences {$a_i$} such that $A_0$=L and $A_g$=1 for g=1, ..., (L−1) are said to have the property P1. The binary pseudo-random sequences that are known as maximum length binary pseudo-random sequences exhibit property P1.

For example, for L=15, one obtains the sequence:

0 0 0 1 0 0 1 1 0 1 0 1 1 1 1    (1)

Replacing each 0 by −1, one obtains a sequence which exhibits property P1:

−1 −1 −1 1 −1 −1 1 1 −1 1 −1 1 1 1 1    (2)

Another family of periodic binary pseudo-random sequences exhibiting property P1 comprises all sequences whose elements are determined by the quadratic and non-quadratic residues of prime numbers of the 4K−1 form. These sequences have a length L defined as L=4K−1 where L is a prime number and K a positive integer. For example, for L=11, the following sequence is obtained:

1 1 −1 1 1 1 −1 −1 −1 1 −1    (3)

The CAZAC sequences may be obtained by adding an imaginary constant jα to each of the elements $a_i$ of the sequences which have the property P1. This constant is defined as $$\alpha = \pm \frac{1}{\sqrt{L}} \quad (4)$$

For example, in the case of sequence (2) of length L=15, α=±0.2582. If a value of α=±0.2582 is selected, sequence (2) becomes:

−1+0.2582j; −1+0.2582j; −1+0.2582j; +1+0.2582j;
−1+0.2582j; −1+0.2582 j; +1+0.2582j; +1+0.2582j;
−1+0.2582j; +1+0.2582j; −1+0.2582j; +1+0.2582j;
+1+0.2582j; +1+0.2582j; +1+0.2582j.
(j=$\sqrt{-1}$).

The sequence thus obtained will be designated {$u_i$} hereafter. The autocorrelation matrix of these sequences is:

$$U = \begin{bmatrix} U_0 & U_1 & U_2 & \cdots & U_{L-1} \\ U_1 & U_0 & & & U_{L-2} \\ U_2 & U_1 & U_0 & & \\ U_{L-1} & & \cdots & & U_0 \end{bmatrix}$$

where $U_g$ is the $g^{th}$ coefficient of the periodic autocorrelation function $$U_g = \sum_{i=0}^{L-1} u_i u_{i+g}^*$$

for g=0, 1, ..., (L−1), and $u_i^*+g^*$ is the complex conjugate of $u_{i+g}$.

All sequences {$u_i$} have the following property P2:
$U_0 \neq 0$ and $U_g$=0 for g=1, ..., (L−1).

Subsequently, it will further be assumed that $U_0$=L which can be obtained conventionally by dividing each element of sequence {$u_i$} by a suitable factor.

If the transmitted training sequences {$u_i$} have the following property P3:
$U_0$=L and $U_g$=0 for g=1, ..., (L−1).

Such a sequence, which has an autocorrelation function all the coefficients of which except the first, $U_0$, are zero and all of elements are complex numbers having a constant amplitude, is also a CAZAC sequence.

Another family of CAZAC sequences, as defined above, is comprised of sequences {$u_i$} of length L=$K^2$ defined as $u_i = W^{\beta\gamma}$, where
β,γ=0, 1, ..., (K−1)
i=Kβ+γ=0, 1, ..., (L−1), and
W is a primitive $K^{th}$ root of unity, e.g., W=exp(2jπ/K).

The sequence can be obtained by using the elements in the successive rows of the matrix ($W^{\beta\gamma}$).

For example, for K=4, L=16, and W=exp(jπ/2), the matrix ($W^{\beta\gamma}$) is written $$W^{\beta\gamma} = \begin{bmatrix} 1 & 1 & 1 & 1 \\ 1 & j & -1 & -j \\ 1 & -1 & 1 & -1 \\ 1 & -j & -1 & j \end{bmatrix}$$

The following sequence is obtained:
1 1 1 1 1 j −1 1 1 −j 1 −1 1 −1 1 −j −1 j

It should be noted that the elements of this sequence have a constant amplitude equal to 1 and can have four different phases.

Another family of CAZAC sequences is comprised of all sequences {$u_i$} of length L=odd integer, defined as
$u_i = W^{i^2}$ where i=0, ..., (L−1), and W is a primitive $L^{th}$ root of unity.

For example, with L=3 and W=exp (j2π/3), the following sequence is obtained:
1, cos 2π/3+j sin 2π/3, cos 2π/3+j sin 2π/3.

Another family of CAZAC sequences comprises the sequences {$u_L$} of length L=$m^{2K}$+1 defined as $u_i = a_\beta$ (modulo m) $W^{\beta\gamma}$, where
{$a_m$} is a CAZAC sequence of length m
n=0, 1, ..., (m−1)
β=0, 1, ..., (M−1)M=$m^{K+1}$
γ=0, 1, ..., (n−1)n=$m^K$
i=Mβ+γ, and
W is a primitive $M^{th}$ root of unity.

The sequence can be obtained by using the various elements in the successive rows of the M×N matrix defined as ($a_\beta$ (modulo m)) $W^{\beta\gamma}$. For example, for m=2 and k=1, one has L=$2^3$=8, m=$2^2$=4, n=$2^1$=2, and W=exp jπ/2=j.

If {$a_m$}=1, j is selected as a CAZAC sequence of length m=2, the following sequence results:
1 1 j −1 1 −1 j 1

A CAZAC sequence {$u_i$}={$u_{L=4m}$} of length L=4m may be used which is derived from two CAZAC sequences {$a_i$} and {$b_i$} of length m. The sequence {$u_{L=4m}$} is obtained by putting
$u_{2k} = a_k$ (modulo m)
$u_{2k+1} = b_k$ (modulo m) $W^k$
for k=0,1, ..., (2m−1), where W is a primitive $(2m)^{th}$ root of unity.

For example, from the CAZAC sequences of length m=4, $\{a_i\}=\{b_i\}=1\ 1\ 1\ -1$, the following CAZAC sequence $\{u_i\}=\{u_{16}\}$ of length L=16 results:

1, 1, 1, $e^{j\pi}/4$, 1, j, −1, $-e^{3j\pi}/4$, 1, −1, 1, $e^{5j\pi}/4$, 1, −j, −1, $-e^{j\pi}/4$.

A 4-phase CAZAC sequence $\{c_n\}$ of length 16 symbols can be determined by $c_{4\cdot k+l}=j^{k\cdot l}$, $j=\sqrt{-1}$, k=0,1,2,3, l=0,1,2,3 $\{c_n\}=\{1,1,1,1,1,j,-1,-j,1,-1,1,-1,1,-j,-1,j\}$ A QPSK sequence corresponding to the above sequence is:

1+j, 1+j, 1+j, 1+j, 1+j, −1+j, −1−j, 1−j, 1+j, −1j, 1+j, −1−j, 1+j, 1−j, −1−j, −1+j

For notational purposes, if $c_0, c_1 \ldots c_{15}$ refers to a CAZAC sequence $\{c_{16}\}=0.5.*[1+j,\ 1+j,\ -1-j,\ 1+j,\ 1+j,\ -1+j,\ 1+j,\ 1-j,\ 1+j,\ -1-j,\ -1-j,\ -1-j,\ 1+j,\ 1-j,\ 1+j,\ -1+j]$ (a 16 symbol CAZAC sequence), the sequence $\{d_{17}\}=d_1, d_2 \ldots d_{16}$ will refer to a sequence such that a discrete time derivative of $\{d_{17}\}=\{c_{16}\}$, i.e., $\{c_{16}\}$ is a derivative of $\{d_{17}\}$, where the first symbol $d_0=1+j$ is added to the sequence to enable the differentiation to result in a 16 symbol sequence (i.e., $d_0=d_1$):

$\{d_{17}\}=0.5.*[1+j, 1+j, 1+j, -1-j, -1-j, -1-j, 1-j, 1+j, 1-j, 1-j, 1+j]$

A corresponding 16 symbol differential sequence $\{d_{16}\}=0.5.*[1+j, 1+j, -1-j, -1-j, -1-j, 1-j, 1-j, -1-j, -1-j, 1+j, -1-j, 1+j, 1+j, 1-j, 1-j, 1+j]$ is a 16 symbol near $\{d_{17}\}$ and CAZAC sequence (i.e., with the symbol $d_0$ of $\{d_{17}\}$ deleted)—in other words, although $\{d_{16}\}$ are not, strictly speaking, CAZAC, their properties are such that the receiver can detect it as if it were CAZAC. $\{d_{16}\}$ may also be referred to as a truncated $\{d_{17}\}$ sequence (in this case, truncated by one symbol).

Note also that $\{c_{16}\}$ represents the changes in $\{d_{17}\}$. Conversely, again ignoring the distinction between discrete and continuous functions $\{c_{16}\}=d\{d_{17}\}/dn$ (n being the time variable). When $d_i$ is unchanged in two successive symbols, $c_i$ is 1+j. When $d_i$ is inverted (180 degree change from one symbol to the next), $c_i$ is −1−j. When $d_i$ rotates 90 degrees in one direction, $c_i$ is 1−j. When $d_i$ rotates 90 degrees in the other direction, $c_i$ is −1+j. This means that $\{c_{16}\}$ is the differential decoding of $\{d_{17}\}$—decoding $\{d_{17}\}$ gives a CAZAC. Conversely, $\{d_{17}\}$ is the differential encoding of $\{c_{16}\}$—encoding a CAZAC gives a near-CAZAC. Note further that a CAZAC is a special case of a zero autocorrelation sequence. Since the signals are digital, the term "derivative" or "differentiation" here is used to refer to discrete operation, rather than continuous. Similarly, $\{d_{16}\}$ represents an integral of a discrete function (sequence) represented by $\{c_{16}\}$.

Figure 2:
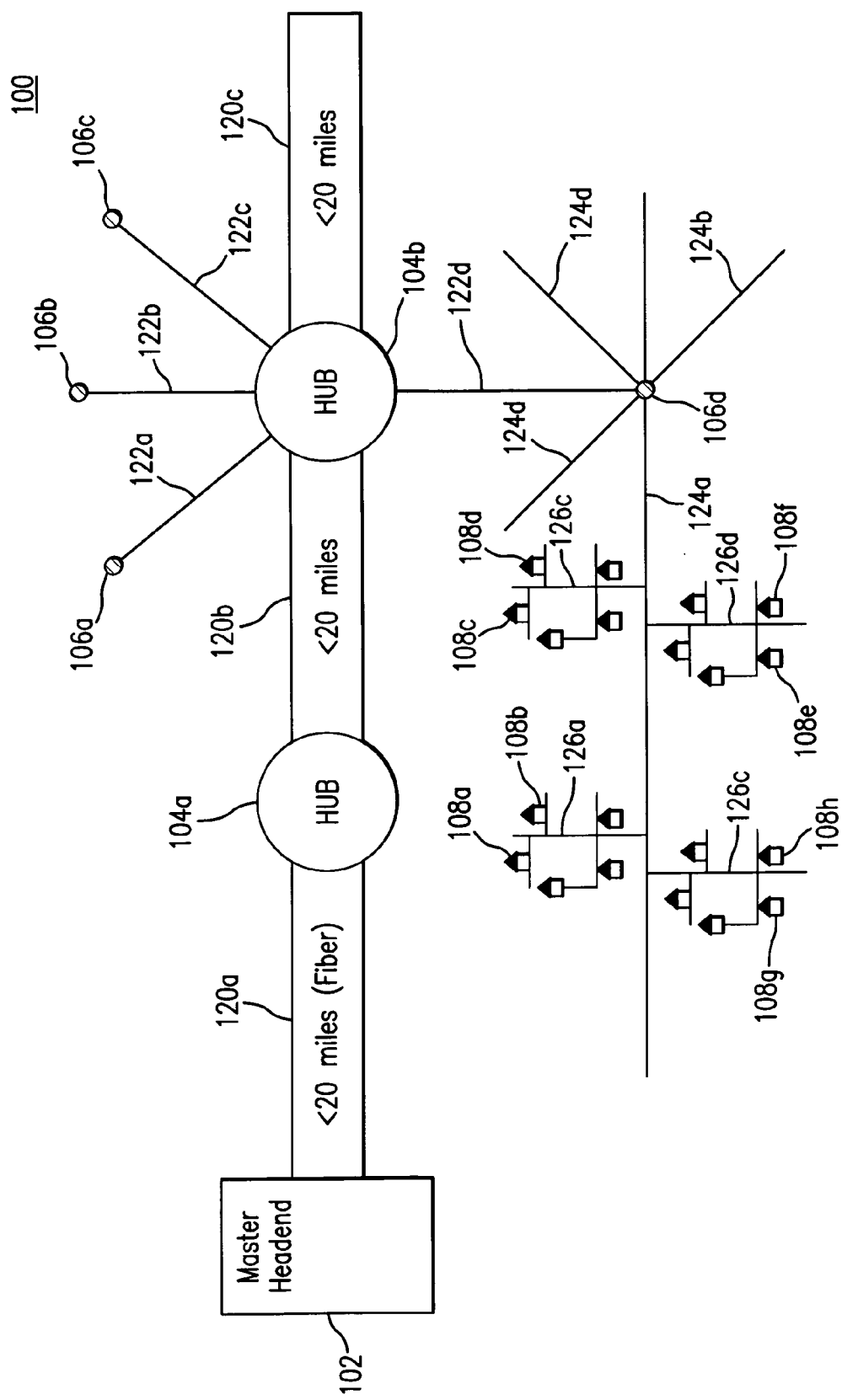
FIG. 2 is a block diagram of an exemplary cable-based communications system.

FIG. 2 is a block diagram of an exemplary cable based communications system 100 according to the present invention. The communications system 100 includes a master headend 102, hubs 104a–b, nodes 106a–d, and a plurality of subscribers 108. The subscribers 108 exchange bidirectional communications traffic with a master headend 102 through various optical and electrical media. For instance, communications traffic is passed between the master headend 102 and the hub(s) 104 through optical media, while communications traffic is passed between the nodes 106 and the subscribers 108 through electrical media. These optical and electrical media are described below.

Fiber optic backbone segments 120a–c provide an interconnection between the master headend 102 and the hubs 104. As shown in FIG. 2, the backbone segments 120a–c each have exemplary distances of twenty miles or less. However, distances greater than twenty miles are within the scope of the present invention.

The nodes 106 each provide an interface between optical communications media and electrical communications media. As shown in FIG. 2 the fiber optic lines 122 establish connections between the hubs 104 and the nodes 106. For example, the fiber optic line 122d connects the hub 104b and the node 106d. Also, the nodes 106 are each coupled to one or more coaxial cables 124. The coaxial cables 124, in conjunction with coaxial cables 126, exchange electrical signals with the subscribers 108. For example, the coaxial cable 124a and the coaxial cable 126d connects the node 106d with the subscribers 108e and 108f.

Traffic in the communications system 100 includes upstream traffic and downstream traffic. Downstream traffic is received by the subscribers 108 from system elements, such as the master headend 102. In contrast, upstream traffic is originated by the subscribers 108 and directed to system elements, such as the master headend 102.

For the coaxial cables 124, the upstream and downstream traffic are each allocated to a particular frequency band. For example, upstream traffic may be allocated to a 5–42 MHz frequency band, while downstream traffic may be allocated to a 54–860 MHz frequency band. One or more frequency channels exist within these frequency bands that provide for the transmission of signals. These signals are modulated according to a digital modulation scheme, such as quadrature amplitude modulation (QAM) or quadrature phase shift keying (QPSK).

Multiple subscribers 108 share the electrical and optical communications media of the communications system 100. For instance, in the context of the coaxial cables 124 and 126, the subscribers 108 transmit signals across the same frequency channel in the same coaxial cable 124. To accommodate such frequency channel sharing, the communications system 100 employs a multiple access technique, such as TDMA for upstream traffic.

TDMA is a transmission scheme that allows a number of subscribers 108 to transmit information across a single frequency channel without interference. This is enabled by allocating unique time slots to each subscriber 108. According to TDMA, the subscribers 108 send upstream transmissions across a channel during one or more time slots that occur within a TDMA frame. Various types of time slots exist. Three examples are reservation slots, contention slots, and maintenance slots.

The present invention provides a receiver having onboard spectral analysis capabilities that may be synchronized to one or more particular upstream transmissions. Accordingly, the receiver may be included in the communications system 100 elements, such as the nodes 106, the hubs 104 and/or the master headend 102. The receiver may be implemented on a chip.

Embodiments of the present invention employ techniques that digitally compute spectral information corresponding to one or more transmissions. For example, the present invention may employ Fast Fourier Transforms (FFT), filter banks, such as quadrature mirror filter banks and wavelet filter banks, and any other spectral analysis techniques that are apparent to persons skilled in the relevant art.

An embodiment of the present invention further provides an on-chip spectral analysis capability that is traditionally performed by general-purpose processors, rather than by receivers such as TDMA burst receivers. This on-chip capability advantageously provides for the performance of sophisticated spectrum management functions in a practical and economical manner. For instance, the present invention eliminates the need for external spectrum computation equipment. Furthermore, the present invention does not require special software to be written to compute the spectrum.

This spectral analysis may indicate the spectral shape of transmitted signals, including whether they meet any specified transmit spectral mask(s). In addition, this analysis reveals the presence of interfering signals, the background noise floor (including its level and shape), and the presence of partial spectral nulls in the upstream transmission signals. Such nulls indicate reflections (echoes) in the upstream path.

When operating in a TDMA environment, this spectral analysis (e.g., performing an FFT) may be synchronized to one or more TDMA slots. This permits the analysis of the spectrum of a single user transmission, and/or a class of user transmissions (e.g., for each type of TDMA slot). As a result, this spectrum analysis yields channel quality information that can be used to efficiently manage the usage of TDMA, FDMA, and TDMA/FDMA systems.

This channel quality information may include spectral measurements arranged in a plurality of bins that each correspond to a respective frequency range. These bins are each computed from the same block of transmission signal samples. Thus, the present invention eliminates the aforementioned confusion generated by swept spectrum analyzers, since no sweeping occurs.

Figure 3:
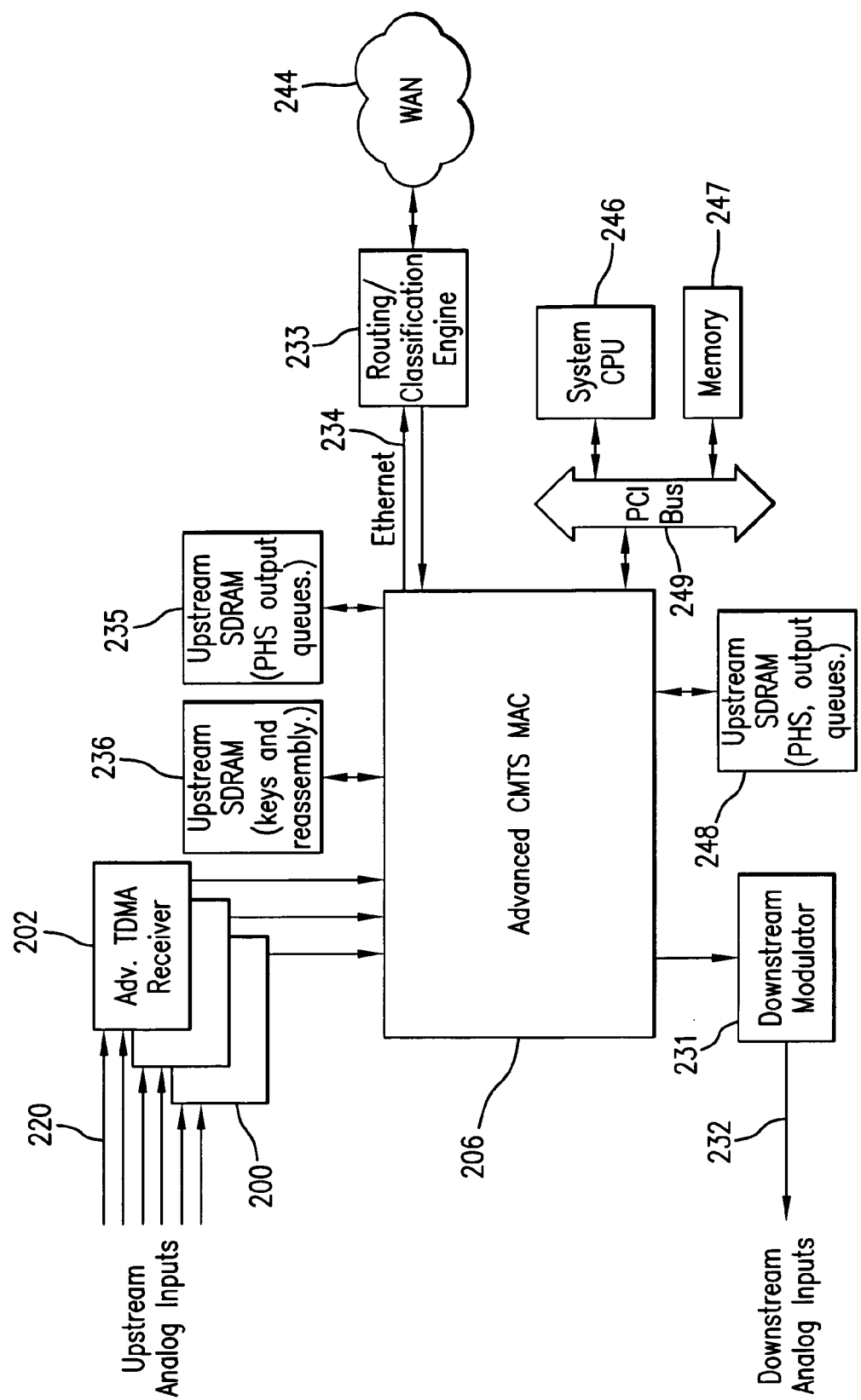
FIG. 3 is a diagram illustrating the head end architecture at a cable modem termination system (CMTS)

One embodiment of the present invention provides an on-chip FFT computation capability integrated into a headend burst receiver chip. FIG. 3 further illustrates the configuration of the master head end 102 of one embodiment of the present invention. As illustrated in FIG. 3, analog inputs 220 are received by a burst receiver 202. The burst receiver 202 communicates with a MAC controller 206.

The MAC controller 206 communicates over the Ethernet 234 with a Routing/Classification Engine 233, which in turn is connected to a Wide Area Network 244 (WAN). The MAC controller 206 utilizes upstream SDRAM 236 for keys in reassembly, and further utilizes upstream SDRAM 235 for PHS output queues.

The MAC controller 206 is connected to a PCI bus 249, and through the PCI bus 249 to a System CPU 246 and a System Memory 247. The MAC controller 206 is further connected to a downstream SDRAM 248. Data flows through the downstream modulator 231, and is then output as downstream analog transmission 232.

Figure 4:
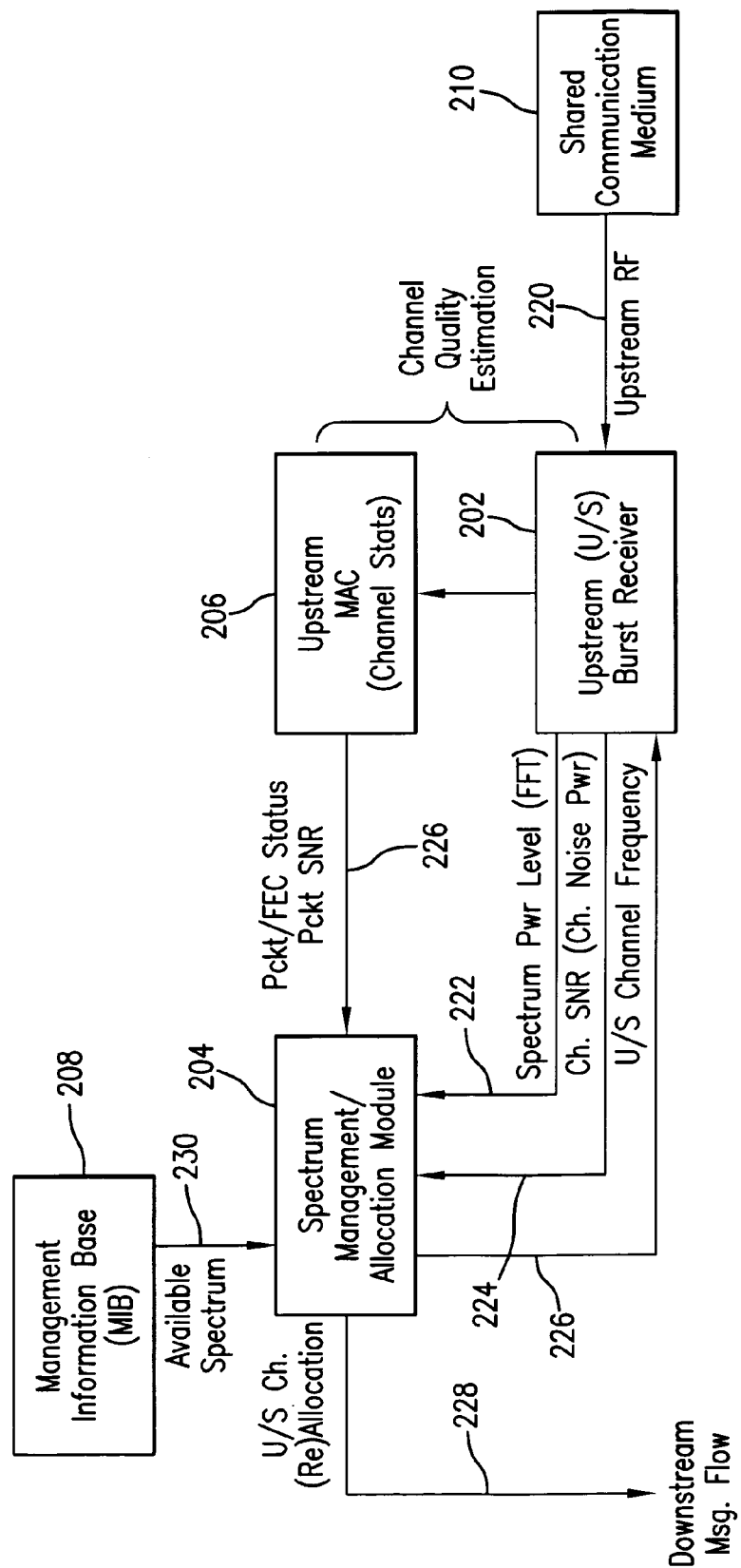
FIG. 4 further illustrates the relationship between components at a head end of a cable modem termination system (CMTS) of FIG. 2.

FIG. 4 is a block diagram illustrating the spectrum management architecture of the present invention. This architecture includes the upstream burst receiver 202, a spectrum management/allocation module 204, the upstream media access controller (MAC) 206, and a management information base (MIB) 208.

The upstream burst receiver 202 receives an upstream transmission 220 from a shared communications medium 210, which may be one of several types of communications media, for example, a coaxial cable, a fiber optic transmission medium, a satellite communication system, or a wireless medium that conveys wireless radio frequency (RF) signals.

Figure 5:
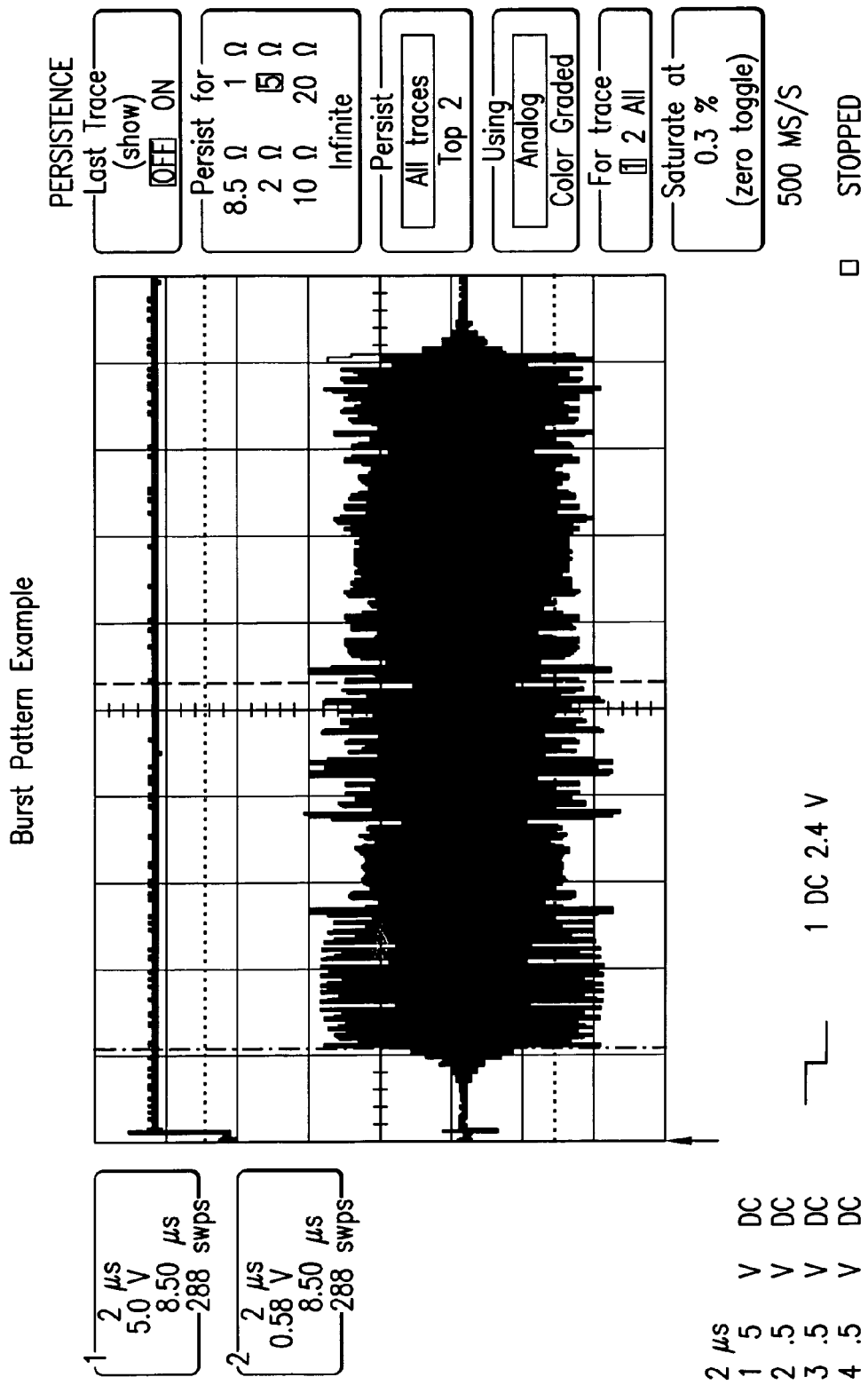
FIG. 5 illustrates a burst as a function of time.

The upstream transmission 220 is a burst transmission (also referred to herein as a packet) that is transmitted by a user, such as the subscriber 108 (see FIG. 2). The upstream burst receiver 202 acquires the timing of packet 220 and decodes it according to an error correction coding scheme (e.g., Reed Solomon), and obtains the payload (i.e., user data) from each packet 220. An example of a packet waveform is illustrated in FIG. 5.

The upstream burst receiver 202 passes some of the recovered information to the MAC controller 206. For example, some burst transmissions from users are requests for bandwidth allocation. The MAC controller 206 receives such requests and, in response, allocates upstream communications capacity to satisfy such requests. In addition, the upstream burst receiver 202 transfers traffic performance statistics to the MAC controller 206. Examples of these statistics include packet error rates (PER) and signal to noise (SNR) ratios.

The spectrum management/allocation module 204 receives information from the upstream burst receiver 202, the MAC controller 206 and the MIB 208. From this information, the spectrum management/allocation module 204 generates upstream channel frequency assignments, which are sent to the upstream burst receiver 202. These assignments instruct the upstream burst receiver 202 to operate within certain portions of the upstream RF spectrum. In addition, the spectrum management/allocation module 204 generates an upstream channel allocation message that is sent to the subscribers 108. This message directs the subscribers 108 to operate within certain portions of the RF spectrum.

The spectrum management/allocation module 204 receives a channel quality message 226 from the MAC controller 206. This message includes information such as packet error rates (PER), and packet SNR.

The spectrum management/allocation module 204 receives an FFT message 222 from the upstream burst receiver 202. In addition, the spectrum management/allocation module 204 receives a channel SNR (channel noise power) message 224 from the upstream burst receiver 202.

The spectrum management/allocation module 204 receives a spectrum availability message 230 from the MIB 208. The spectrum management/allocation module 204 processes these received messages and, in response, generates a spectrum allocation plan. The spectrum allocation plan designates which portions of the spectrum are used by which subscriber to transfer information across the shared communications medium 210. In addition, this plan specifies the characteristics of individual signals transmitted across these spectral portions. For example, the plan may specify transmit powers, data rates, and spacing between frequency channels in an FDMA environment.

Figure 6:
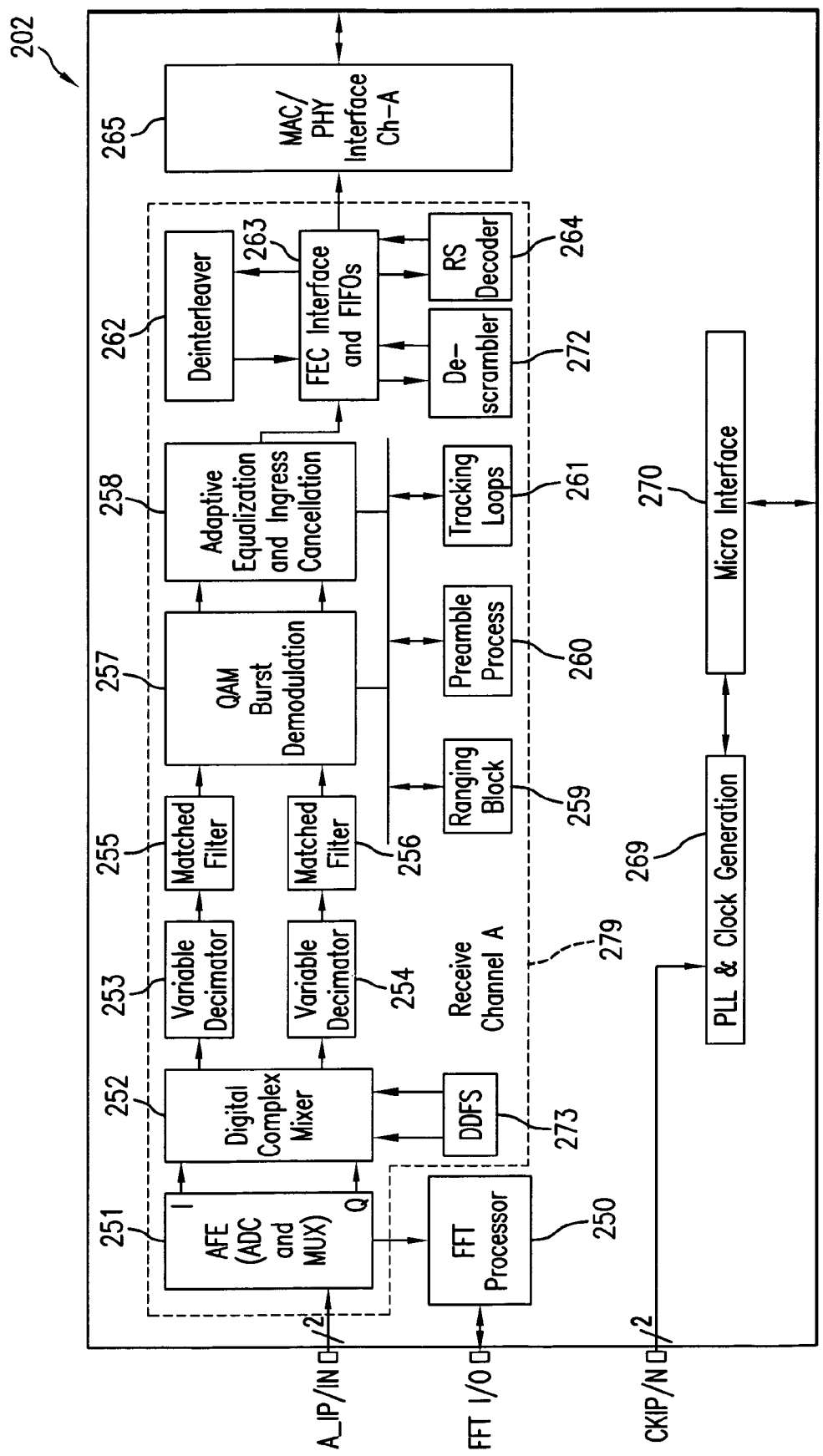
FIG. 6 is a block diagram illustrating a burst receiver of one embodiment of the present invention.

As further shown in FIG. 6, the embodiment includes an advanced dual-channel cable network receiver which accepts upstream burst data in a frequency-agile, time-division multiple access (TDMA) scheme (only one channel is shown in the figure for clarity). The architecture of the burst receiver 202 in an embodiment includes an FFT processor 250. The burst receiver 202 further includes an analog front end (AFE) 251 (including a multiplexer), which forwards the received data into a digital complex mixer 252 IP. The burst receiver 202 can decode signal formats from BPSK up to 256-QAM.

The analog front-end (AFE) 251, a QAM demodulator 257 and an FEC (forward error correction) decoder 263 are integrated for each channel. The AFE 251 performs A-to-D conversion on either an IF input, an RF input, or baseband I/Q inputs. A multiplexing logic may be also included to share the same ADC output between two receive channels or to receive digital samples from an external ADC. The multiplexing logic can receive external ADC outputs at much higher sampling rates to perform direct RF sampling. The multiplexing logic allows the receiving two frequency channels from the same cable network, or process inputs from two separate cable networks.

A digital quadrature down-mixer 252 translates an input spectral center to true DC. The mixer 252 is used to move the quantize IF samples to true DC, for example, using quadrature carriers generated from a programmable direct digital frequency synthesizer (DDFS) 273. The digital down-mixer 252 then translates the desired channel down to DC.

The I and Q samples pass through decimators 253, 254 and square-root raised cosine filters 255, 256 with an excess bandwidth $\alpha=0.25$. The over-sampled I and Q signals from the digital down-mixer 252 pass through dual decimators 253, 254 that are programmed based on the expected symbol rate. The decimated samples pass through dual square-root Nyquist filters 255, 256 with an excess bandwidth $\alpha=0.25$ to match the pulse-shaping filters on transmitter side.

Fast burst detection and acquisition are performed on the preamble with programmable length and pattern. The fast acquisition for carrier phase and symbol timing is performed on preamble symbols. Each received TDMA burst contains a PHY overhead which includes a preamble using QPSK-like signaling, no matter what is the actual modulation format for the payload. Since the four-fold ambiguity of the carrier phase can be resolved by matching the preamble pattern, there is no need for differential coding which degrades the effective FEC performance. Depending on the payload modulation format, the burst receiver 202 may acquire burst synchronization on a short preamble, even if the burst-to-burst power variation is over 20 dB. An option of processing a BPSK preamble is also preferably provided.

An adaptive equalizer 258 characterizes the RF channel response and removes inter-symbol interference (ISI) caused by micro-reflections. An equalizer is needed at high symbol rates, especially for high modulation level (beyond QPSK), to mitigate channel impairments due to micro-reflections. The embodiment implements a 24-tap complex linear (feed-forward) equalizer. During initialization, the equalizer 258 adapts to each subscriber channel and sends its coefficients to the MAC controller 206. The MAC controller 206 sends the information back to the individual subscriber 108 via the downstream path 232 to program the transmitter's pre-equalizer. This scheme avoids the need for long preambles for future incoming bursts from the same subscriber 108, and improves the overall efficiency of bandwidth usage.

An ingress-cancelling processor 258 suppresses narrow-band noise and/or adjacent-channel interference (ACI). The Forward Error Correction (FEC) decoder 263 performs deinterleaving, descrambling and RS decoding with flexible parameters. The recovered data stream is delivered and burst receiver 202 control inputs are accepted through a MAC/PHY receive interface 265 linked to a MAC controller 206. The embodiment can interface with the MAC controller 206 with serial bit transfer, and also supports an advanced MAC/PHY interface for higher data rates. An on-chip FFT processor can analyze an RF spectrum with a selectable bandwidth and length.

The ingress cancelling logic analyzes the noise environment of the desired upstream channel. The ingress cancelling logic then suppresses narrow-band ingress and/or adjacent-channel interference appearing in the desired upstream channel to maximize the usage of the entire upstream band.

The upstream transmitter (user) 108 scrambles the data stream to ensure adequate symbol transitions for symbol timing recovery in the burst receiver 202. A descrambler 272 recovers the raw data stream and is reinitialized on each burst. The generator polymial and initial seed are both programmable up to 23 bits.

The upstream transmitter 108 performs data interleaving within each burst in a byte format. The interleaving type is block interleaving with variable block size and interleaving depth depending on the burst type. Thus, the deinterleaver 262 supports real-time changes on the interleaving block size and depth. In a dynamic mode, the deinterleaving block size can be adjusted within one burst to avoid leaving a small fraction for the last interleaving block.

The Reed-Solomon decoder 264 is over GF(256) and is programmable to correct errors from 1 to 16 bytes within an FEC data block (or codeword). The generator polynomial is also programmable. The last FEC codeword can be either fixed-length or shortened.

The FEC decoder 263 can be configured to have the descrambler located either before the deinterleaver 262 or after the RS decoder 272.

The data from the demodulator 257 and the equalizer 258 is utilized by a ranging block 259 in order to allow for different distances (ranges) to the transmitter. The widespread distance from head-end to each subscriber in a cable network introduces relatively large receive timing and power uncertainties for the receiver, which must be compensated for by means of a ranging process during initialization. A special ranging sequence with a long preamble in a ranging time slot is preferably reserved, as described below. The ranging block 259 estimates the receive timing and amplitude of the ranging sequence and passes the measurements to the MAC controller 206. The MAC controller 206 assembles the information and sends it back to the individual subscriber 108 via the downstream path 232 (see FIG. 6). The subscriber 108 can then adjust its own transmit timing and power level. Any large frequency offset in a transmitter is also measured and can be corrected during the ranging process.

A preamble processor 260 analyzes the preamble in each burst. The data from the preamble processor 260 is also utilized by the ranging block 259.

Tracking loops 261 also utilize the data from preamble processor 260. The operation of the digital tracking loops for carrier phase and symbol timing follows the initial preamble process. The tracking loops 261 further utilize the adaptive equalization and ingress cancellation module 258. Data is then forwarded to a forward error correction interface module 263.

The forward error correction 263 interface uses inputs from the descrambler 272 and the RS decoder 264. Output from the forward error correction interface 263 is used by the deinterleaver 262 and the MAC/PHY interface 265 for Receive Channel A 279.

Additional detail of this embodiment, particularly as it relates to the FFT aspect, may be found in commonly assigned U.S. patent application Ser. No. 10/164,355 filed on Jun. 7, 2002, entitled "RECEIVER HAVING INTEGRATED SPECTRAL ANALYSIS CAPABILITY", which is incorporated herein by reference.

Figure 7:
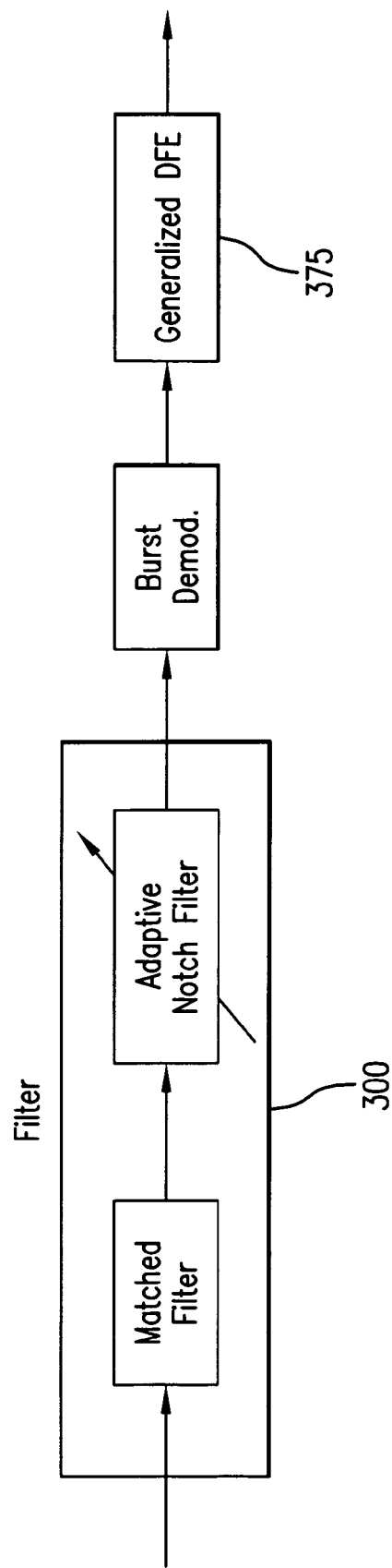
FIG. 7 is a generalized block diagram illustrating reception of a signal including ingress noise.

Generally, when channel impairments such as narrow-band interferers are present in the channel, a pre-filter, such as an adaptive notch filter may be present to cancel the interferers, as shown schematically in FIG. 7. However, the notch filter will create inter-symbol interference (ISI) to the rest of the burst demodulator. This distorts the received signal pattern and thus affects the fidelity of the correlation vector. In order to avoid this effect, the preamble is preferably also pre-distorted by convolving the preamble with the coefficients of the notch filter.

Generally, the effects of inter-symbol interference on the statistics relating to transmission channel errors are relatively minor, provided the delay spread of the channel is substantially shorter than a duration of one symbol. For higher symbol rates, the systems error rate performance usually deteriorates significantly.

Figure 8:
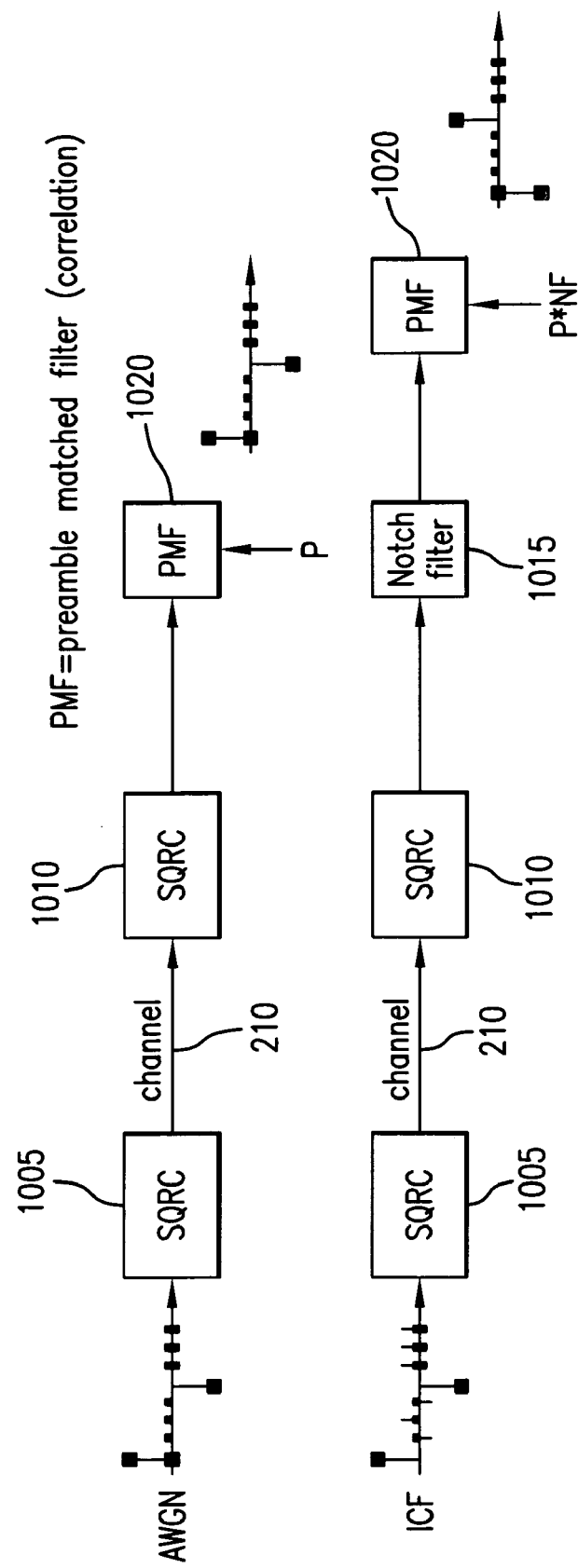
FIG. 8 is a generalized block diagram illustrating reception of a signal and its filtering.

Consider the situation shown in FIG. 8. In FIG. 8, a transmitter at the user end transmits packets with a certain preamble. The transmission passes through a square root raised cosine filter 1005, prior to being transmitted over the channel 210. Additive white noise normally is present in the system. At the receiver end, a square root raised cosine filter 1006 is used, before being fed into a preamble matched filter 520. The preamble matched filter 520 performs a correlation function of the received preamble and a local replica of the preamble. The recovered signal should be the exact preamble that was transmitted from the user end.

In practical systems, however, transmission systems frequently suffer from narrow band noise, sometimes referred to an ingress. As shown in the bottom diagram of FIG. 8, the transmitter transmits a preamble which first passes through the square root raised cosine filter 1005, before being transmitted down the channel 210. At the receive end, the square root raised cosine filter 520 is followed by a notch filter 515.

The signal then passes on to the preamble matched filter (PMF) 520, which performs a correlation between the received preamble and a local replica of the preamble. However, the local replica of the preamble needs to be predistorted by appropriate notch filter coefficients, i.e.:

New preamble=Preamble*(notch filter coefficients).

Note that the preamble preferably should be scaled (normalized), to insure proper operation of the correlation mechanism.

One embodiment of a burst receiver architecture adapted to robust burst detection as discussed above is shown schematically in FIG. 9. It includes a Start of Packet (SOP) detection, initial parameter estimation, and fine tuning using tracking loops and multi-pass processing on the preamble portion. Preamble correlation of a known sequence, such as a 16-symbol CAZAC sequence, is used as the basis of parameter estimation.

Figure 9:
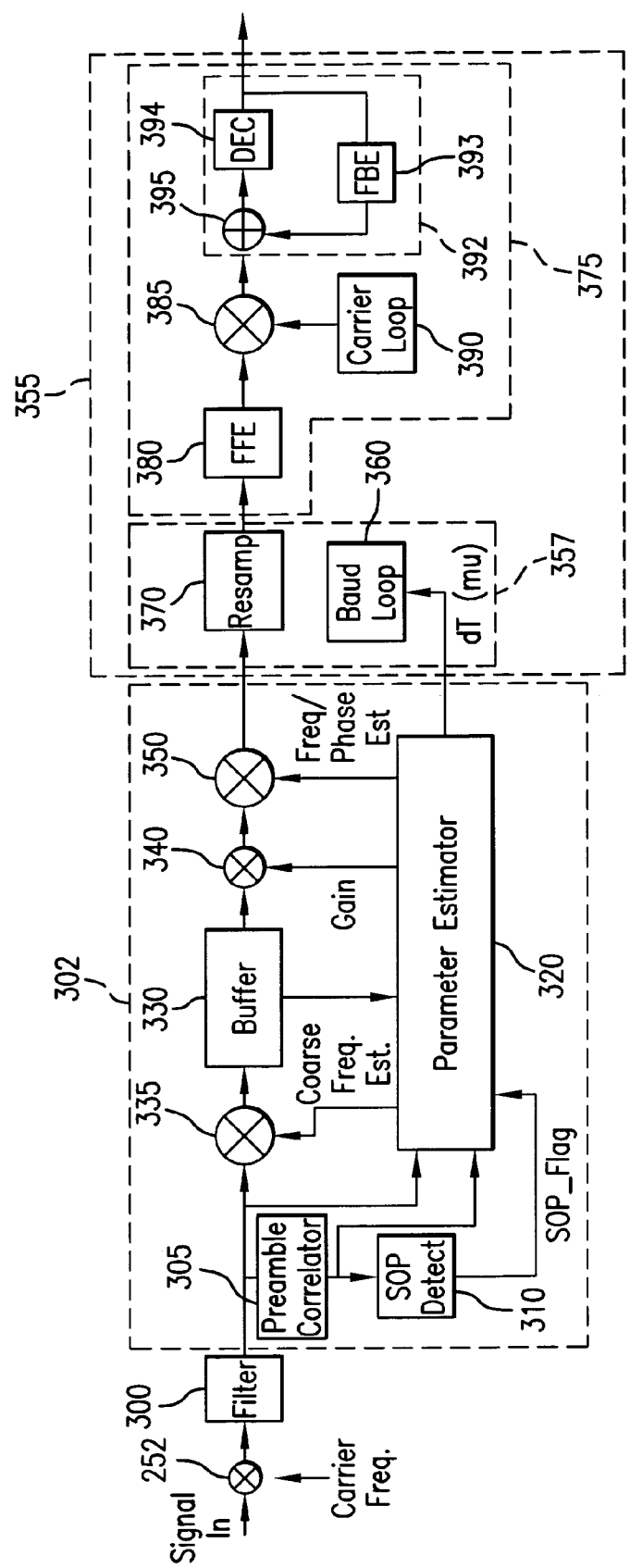
FIG. 9 illustrates an embodiment of the present invention in block diagram form.

FIG. 9 shows the overall system block diagram of a robust burst receiver. Broadly speaking, the relevant portions of the burst receiver 202 may be thought of as including carrier frequency mixer 252, a filter 300, a preamble processor/ranging subsystem 302, and a tracking subsystem 355.

Note that the filter 300 in FIG. 9 corresponds to the variable decimators 353 and 354 and the matched filters 255, 256 of FIG. 6. The preamble processor/ranging subsystem 302 collectively corresponds to the Preamble Processor Block 260 and the Ranging Block 259 of FIG. 6.

As shown in FIG. 9, the filter 300 receives a signal from the analog front end 251 and the mixer 252. Typically, the filter 300 functions as a Nyquist-type filter, which outputs filtered samples to a preamble correlator 305, and a second mixer 335. The preamble correlator 305 correlates the preamble in the received burst with a locally stored replica of the preamble and outputs a correlation vector (CV).

The correlation vector of the received signal with the known sequence is sensitive to carrier frequency offset. To preserve a unique peak of the correlation vector (CV) in the presence of a large frequency offset, the differential correlation technique may also be utilized to indicate the SOP flag during ranging. The differential correlation refers to the correlation of the differentially detected signals. The current signal is multiplied by the complex conjugate of the previous signal at (for example) one symbol apart to produce a new signal. This differential signal is then correlated with the differential preamble signal. This operation turns a frequency offset into a phase offset, thus still producing a reliable peak of the correlation vector even with a large frequency offset. However, this operation results in a nominal 3 dB loss in the effective signal-to-noise ratio (SNR) of the preamble correlation at the receiver. Thus, this option can selectively be disabled when for example the symbol rate is high, which implies relatively small carrier frequency offset at a given system frequency offset between the transmitter and receiver.

Figure 10:
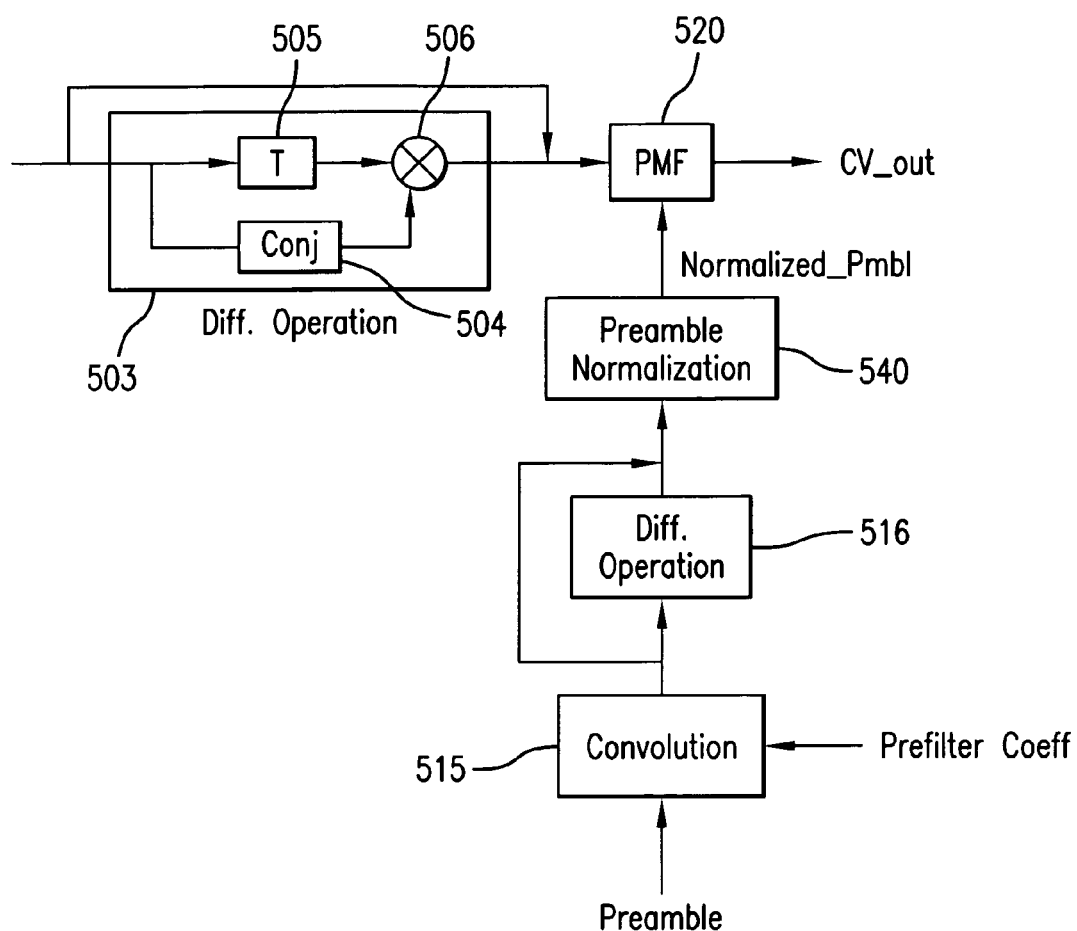
FIG. 10 shows a structure of the preamble correlator of one embodiment of the present invention.

To produce constant, preamble correlation peak value in view of different notch filter coefficients, the total power of the pre-distorted preamble pattern is normalized as shown in FIG. 8. A preamble correlation block diagram with all these techniques incorporated is shown in FIG. 10, as discussed in further detail below.

Carrier frequency is estimated in two steps. First, the phase of the differential correlation peak provides the coarse carrier frequency estimation. The coarse frequency error is compensated by derotating the buffered preamble as referred above. The error estimate is given by $\Delta f = \arg[CV(t_p)e^{j\omega_d}]$. After that, fine carrier frequency can be estimated by comparing the phases of the two consecutive CV peaks as follows:

$$\Delta f = \arg\left[\sum_{k=1}^{P} P(k) \cdot P(k+N)^*\right].$$

Note that this technique is insensitive to the ISI created by the channel. However, its estimation range is limited to $F_{sym}/(2N)$, where N is the correlation vector length in symbols (e.g. a range of 3.125% of $F_{sym}$ for N=16 symbols). Both a large offset range and very accurate estimates can be achieved by using both techniques in sequence.

Note also that in a typical low symbol rate transmission, which usually corresponds to a large frequency offset, differential correlation is used, since there is little ISI/ICF. For a high symbol rate, which corresponds to a small frequency offset and high intersymbol interference/narrow band interference, direct correlation (rather than differential correlation) of the preamble is used.

The peak value of the correlation vector provides an amplitude estimate of the received signal. However, the correlation peak value is sensitive to the residual error of the fine frequency estimation. By compensating by the residual frequency error, the gain estimation can be significantly improved as shown the table of FIG. 14 and described below. Furthermore, the initial gain estimation can be further improved by enabling the fine gain loop—such as equalizer tracking.

FIG. 10 shows additional detail of the preamble correlator 105. The digital signal from the filter 300 goes into a differential operator 503 that includes a delay element 505, a conjugation operator 504, and a multiplier 506. The local replica of the preamble is convolved with prefilter coefficients in a convolution operator 515. The result of the convolution operation is fed into a differential operator 516. A prescaler 540 normalizes the local replica of the preamble, outputting a normalized version of the local replica of the preamble. The normalized local replica of the preamble and the differentiated digital signal from the filter 300 are both input into a preamble matched filter 520, which outputs the vector CV corresponding to the convolution operation of the (differentiated) input signal and the normalized local replica of the preamble.

The output of the preamble matched filter 520 can be used to determine if a packet has been received, i.e. to generate the start of packet signal. In the case of ranging, the preamble correlator performs a correlation between a differentiated version of the preamble and a differentiated version of the locally stored replica of the preamble $\{d_{16}\}_{for}$ $N=16$. In the case of data packets containing a preamble and a data portion as shown in FIG. 1, the preamble correlator 305 will perform a correlation between a CAZAC sequence in the preamble, and a locally stored replica $\{c_{16}\}$ of the CAZAC sequence.

Returning to FIG. 9, the preamble correlator 305 outputs a correlation vector (CV) to a Start Of Packet detector 310 and to a parameter estimator 320. If the Start Of Packet detector 310 detects that the packet is beginning by sensing a peak in the CV, it will output a Start of Packet flag to the parameter estimator 120.

Figure 11:
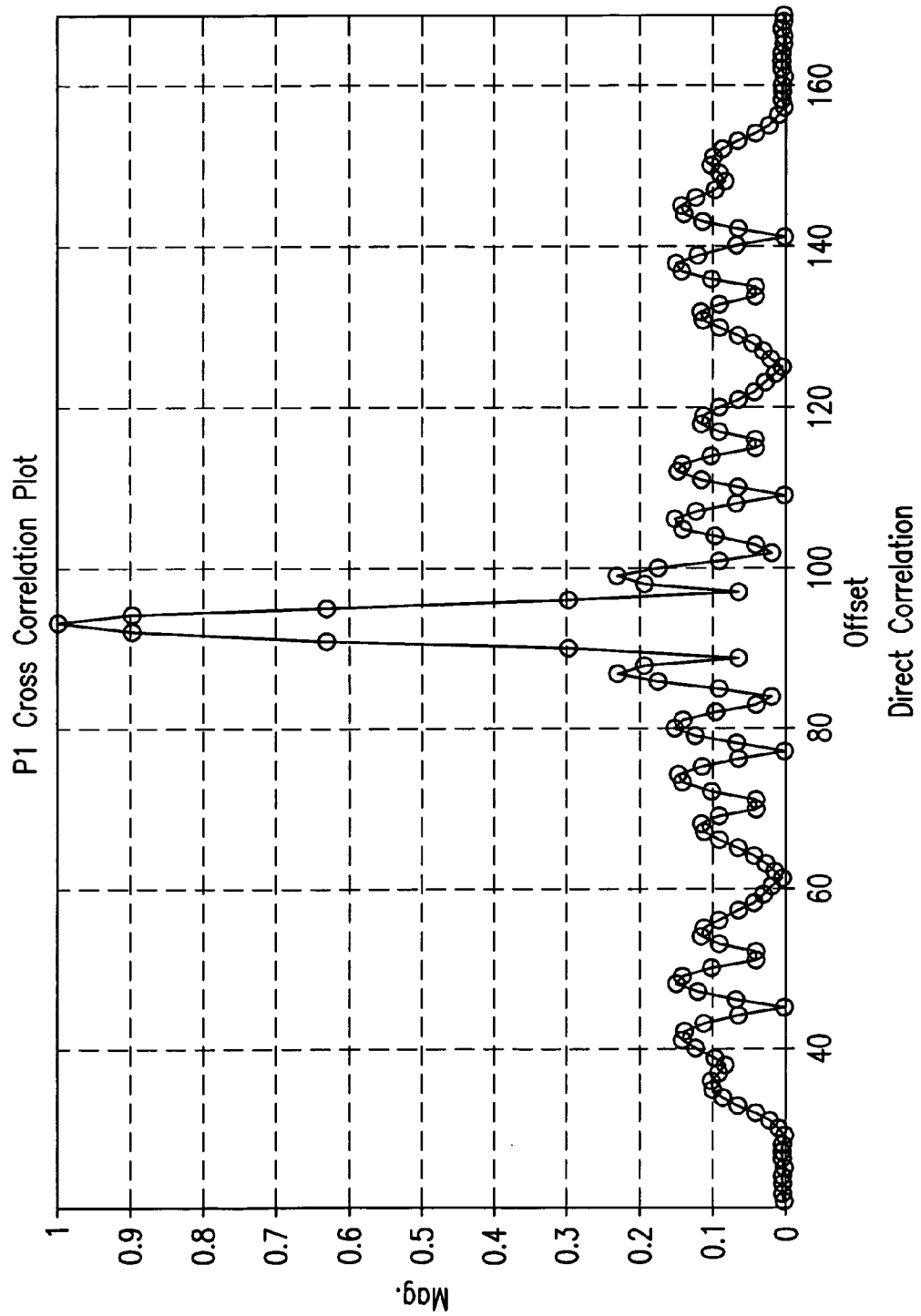
FIG. 11 illustrates a direct correlation vector using a CAZAC sequence.
Figure 12:
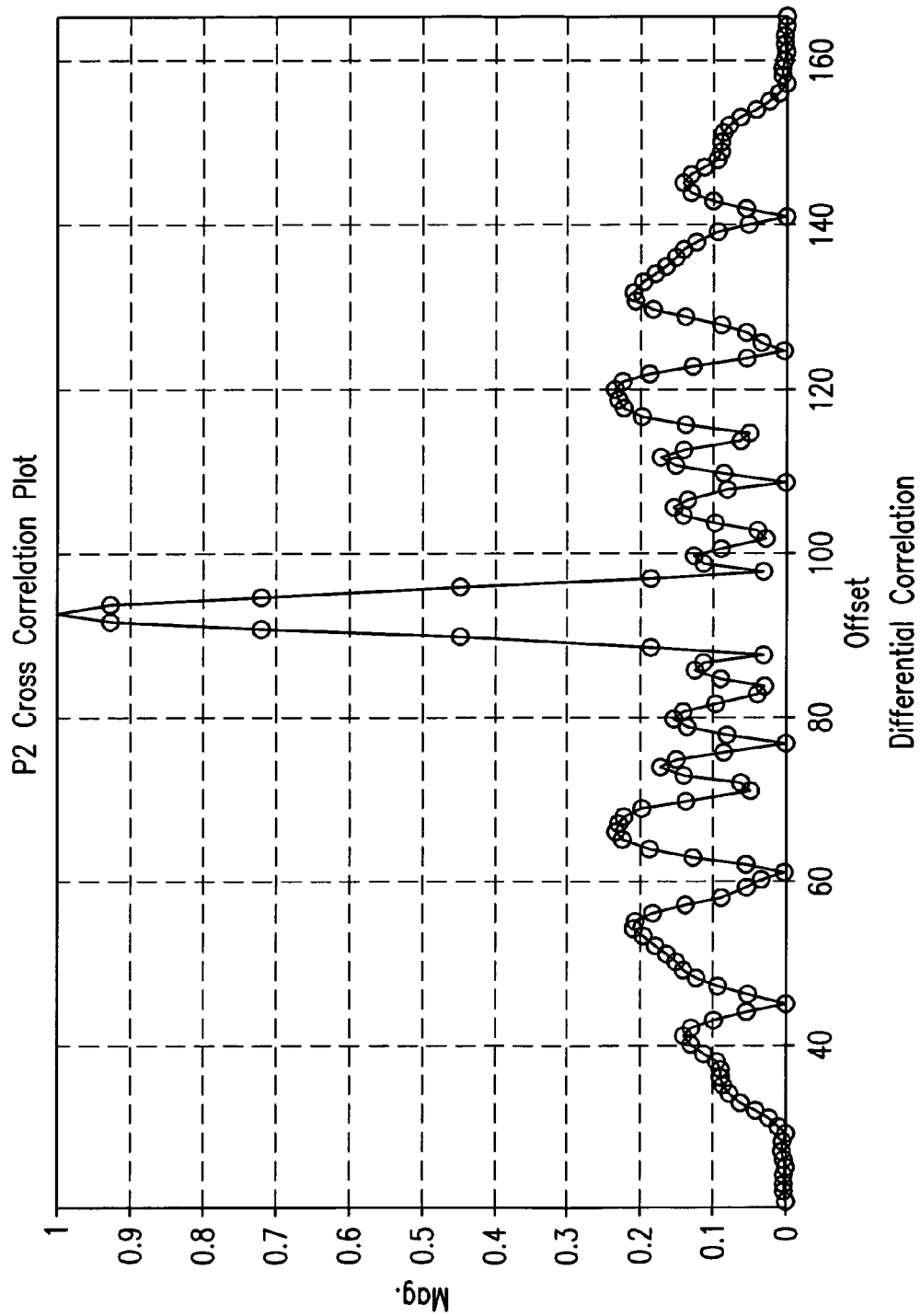
FIG. 12 illustrates a differential correlation vector using a CAZAC sequence.

The parameter estimator 320 is responsible for estimating the four parameters of primary importance: frequency, gain, phase, and symbol timing. Based on a peak of the correlation vector (CV) in the case of ranging, the parameter estimator will estimate a coarse carrier frequency based on a peak of the correlation vector from the preamble correlator 305. An example of a correlation vector CV is shown in FIG. 11, and an example of a differential correlation vector is shown in FIG. 12.

The parameter estimator 320 then outputs a coarse frequency estimate based on a differential CV peak to the second mixer 335. The second mixer 335 outputs phase adjusted samples, with coarse frequency error removed (i.e., with adjusted phase) to a buffer 330. The buffer 330 also stores the samples outputted by the mixer 335. The buffer 330 provides the phase adjusted samples to the parameter estimator 320 and to a multiplier 340.

Figure 13:
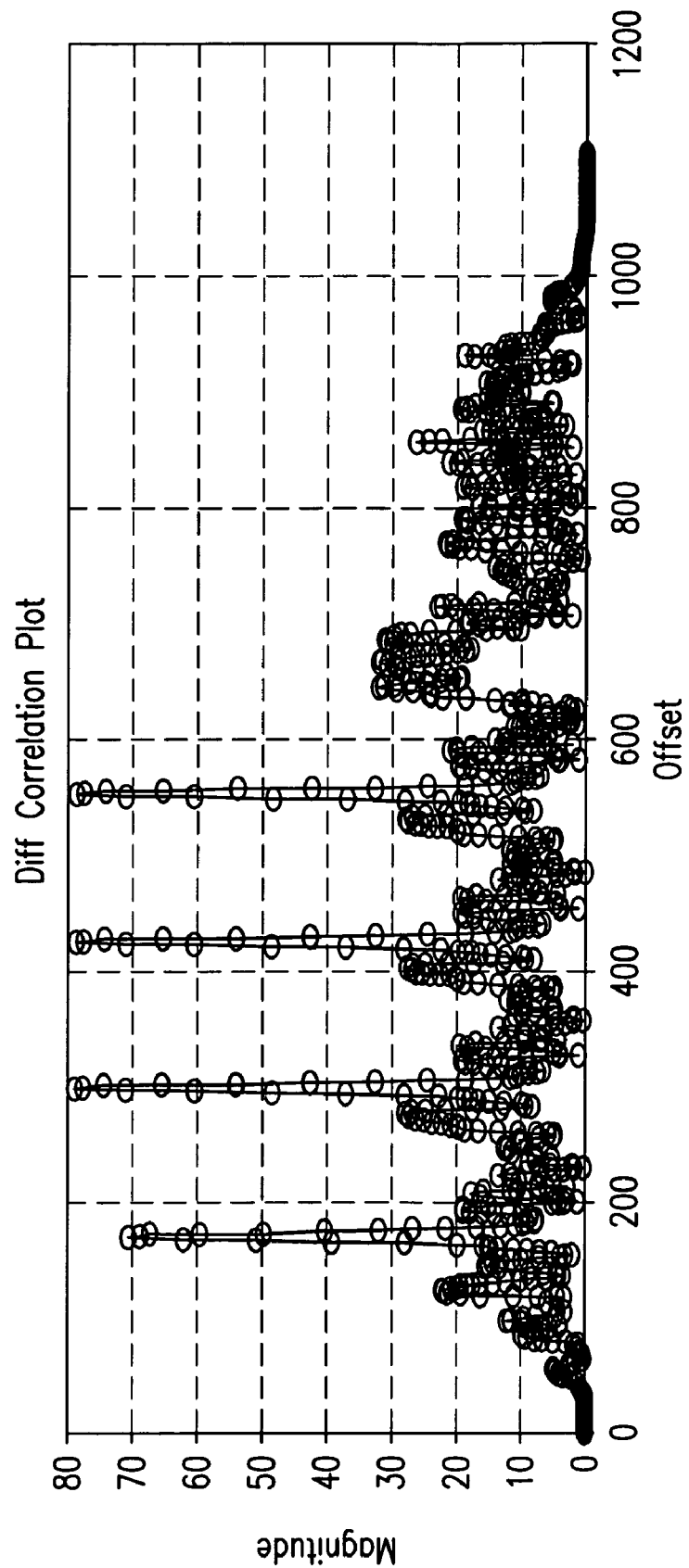
FIG. 13 illustrates a correlation vector for a preamble with four CAZAC-type sequences.

During ranging, the parameter estimator 320 also performs a fine carrier frequency estimate, based on the second and third sequences. (An example of the second and third sequences is $\{d_{16}\}\{d_{16}\}$, as discussed above.) An example of a correlation vector for the entire ranging preamble is illustrated in FIG. 13. As may be seen in FIG. 13, the left-most peak corresponds to a peak of the correlation between a derivative of the first received sequence (which is an integral of a CAZAC sequence) and a locally stored replica of the CAZAC sequence. The next two peaks corresponds to correlations between derivatives of the second and third received sequences, and the locally stored replicas of the CAZAC sequence $\{c_{16}\}\{c_{16}\}$. Based on the second and third peaks exceeding a predetermined threshold, the parameter estimator 320 performs a fine carrier frequency estimate. The fourth CAZAC sequence in the preamble may be used to perform a check, verifying that the fine carrier frequency estimate has been done correctly.

For ranging, (1) the first correlation vector (the differential CV) is greater than a predetermined threshold $th_1$ (e.g., 60 in FIG. 13), and (2) the peak-to-sidelobe ratio for the second CV is greater than a predetermined threshold $th_2$, and (3) there is a slope change from positive to negative (i.e., there is a defined peak for the second correlation vector CV, which is about 78 in FIG. 13), and (4) at NT seconds later, the peak-to-sidelobe ratio for the third CV is greater than a predetermined threshold $th_3$, and (5) there is a slope change from positive to negative (i.e., there is a defined peak for the third correlation vector CV, which is also about 78 in FIG.

13), then the peaks are confirmed, and the signal is acquired, otherwise, there is a reset. The peak to sidelobe ratio (PSR) is defined as:

CV (peak)/avg of CV (samples away from the peak) and provides a relative SNR when gain is normalized (e.g., during ranging).

For packet acquisition, if CV(peak)>$th_1$, and PSR>$th_2$ and there is a slope change in the expected window, then there is burst acquisition, otherwise there is a reset.

The parameter estimator 320 outputs the estimated gain to the multiplier 340, which multiplies the output of the buffer 330 by the estimated gain from the parameter estimator 320, outputting it to a third mixer 350. The third mixer 350 also takes as an input the fine carrier frequency estimate and a phase estimate from the parameter estimator 320. After performing another phase adjustment, the third mixer 350 outputs the phase-adjusted signal to a resampler 370. The parameter estimator 320 also outputs a symbol timing estimate to a baud loop 360.

Still with regard to FIG. 9, the outputs of the third mixer 350 and the parameter estimator 320 go to a tracking subsystem 355. Collectively, the resampler 370 and the baud loop 360 comprise a symbol timing subsystem 357. The symbol timing subsystem 357 outputs re-timed symbol samples to an adaptive equalizer/carrier loop block 375 (see also element 258 in FIG. 6).

Specifically, the adaptive equalizer/carrier loop block 375 includes a feed forward equalizer 380, which receives the re-timed symbol samples from the resampler 370. The feed forward equalizer 380 then outputs the forward equalized samples to a fourth mixer 385. The fourth mixer 385 also takes as input the output of a phase lock loop (carrier loop) 390, and then outputs phase adjusted forward equalized samples to a decision feedback equalizer 392. The decision feedback equalizer 392 includes a summer 395, a decision block 395 and a feedback equalizer 393, as shown in FIG. 9. The output of the decision block 395 are the symbols representing data.

Note that the carrier loop 390 and the baud loop 357 of FIG. 9 correspond to the tracking loops 261 of FIG. 6.

With regard to FIG. 9, it will also be appreciated that certain applications may require additional phase adjustment. For example, in the case of satellite communication, frequency offsets are frequently very large. Thus, in such a system, prior to inputting the signal into the filter 300 of FIG. 9, the signal may pass through a first mixer, to remove a very large frequency offset often found in such satellite systems.

Additionally, as may be seen in FIG. 12, the differential correlation vector (CV) outputted by the preamble correlator 305 in the case of a coarse carrier frequency estimate does not always have a well defined peak. In that case, any number of methods may be used to estimate the peak. For example, in the embodiment, parabolic interpolation is used to interpolate the peak of the differential correlation vector, based on the highest three points in the vector, as shown in FIG. 12. One of ordinary skill in the art will appreciate that the invention is not limited to the parabolic interpolation method, but may use any number of techniques to estimate the location of the peak.

Additionally, the term "mixer" has been used in this context to refer to a multiplier by $e^{j\omega t}$. This, of course, accomplishes a phase adjustment of the signal, without altering its amplitude. It will be appreciated, however, that other methods of adjusting phase exist, in addition to multiplying the signal by $e^{j\omega t}$. For example, a CORDIC processor (coordinate rotation digital computer), which performs a trigonometric rotation by using shifts and adds, without any multiplies, may also be used to accomplish the same purpose. Thus, for purposes of this application, the term "mixer," "derotator" and "phase adjuster" are used interchangeably, to refer to any mechanism for adjusting the phase of a signal.

It has been found empirically that certain combinations of CAZAC sequences provide superior results, particularly when cyclic continuations are included are added to the CAZAC sequence. For example, consider a CAZAC sequence of length 16, designated by $\{c_{16}\}$, which has the following symbols:

$c_0, c_1, c_2 \ldots c_{15}$

It has been found experimentally that rather than using a "bare" CAZAC sequence as above, it is preferable to use a 20-symbol sequence as follows:

$c_{14}, c_{15}, c_0, c_1, c_2 \ldots c_{15}, c_0, c_1$

Which may be written as $c_{14}, c_{15}, \{c_{16}\}, c_0, c_1$. The symbols $c_{14}, c_{15}$ in front of the CAZAC sequence are referred to as a "cyclic continuation," with the inherent property that these symbols must correspond to a continuation of the CAZAC sequence (i.e., for a sequence $\{c_{32}\}=c_0, c_1, c_2 \ldots c_{31}$, the cyclic continuation preceding the sequence $\{c_{32}\}$ would be $c_{30}, c_{31}$, and the cyclic continuation following the sequence $\{c_{32}\}$ is $c_0, c_1$). Note that the sequence of symbols $c_{14}, c_{15}, c_0, c_1, c_2 \ldots c_{15}, c_0, c_1$ does NOT have the CAZAC property, although it is derived from a CAZAC sequence as $c_{14}, c_{15}, \{c_{16}\}, c_0, c_1$ (i.e., a two-symbol cyclic continuation in front of the CAZAC sequence, and a two-symbol cyclic continuation after it). It will also be appreciated that the cyclic continuation need not be two symbols long.

One embodiment for ranging includes at least four sequences plus one cyclic continuation symbol as follows:

$\{d_{17}\}\{d_{16}\}\{d_{16}\}\{d_{16}\}$ for a 65 symbol long ranging preamble. The sequence $\{d_{17}\}$ is used for a coarse frequency estimate, the sequence $\{d_{16}\}$ $\{d_{16}\}$ is used for a fine frequency estimate, and the last sequence $\{d_{16}\}$ is used to perform a check. (See FIG. 13).

In the case of preambles in bursts that contain a payload, other possible sequences are:

$c_{14}, c_{15}, \{c_{16}\}, c_0, c_1$ (a 20 symbol sequence)
$c_{14}, c_{15}, \{c_{16}\}, \{c_{16}\}, c_0, c_1$ (a 36 symbol sequence)
$c_{14}, c_{15}, \{c_{16}\}, \{c_{16}\}, \{c_{16}\}$ (a 50 symbol sequence)
etc. . . .

Which sequence to use in the preamble depends on the order of modulation desired, channel characteristics, etc.

It will also be appreciated that the signal-to-noise ratio (SNR) is determined during ranging. Additionally, if other modems are already operating on the channel, the burst receiver 202 may use information from the other modems to generate an initial estimate of the signal-to-noise ratio.

Additionally, one of the advantages of the present invention is that tracking may be performed continually, including during the data portion of the burst. In other words, although the parameter estimator 320 provides initial estimates that may be true during the preamble portion of the burst, an even better parameter estimate may be accomplished by continually tracking the data. This is accomplished in the decision feedback equalizer 392. Specifically, in one example, once the data portion of the burst is received, the feedback equalizer will gradually converge towards a set of equalizer coefficients (equalizer taps). If the initial gain estimate was too high, the main tap will decrease slightly, and if the initial gain estimate was too low, the main tap will increase slightly, to reflect an even better estimate of the gain required.

Additionally, other taps of the equalizer 392, in some cases all the taps of the equalizer 392, may be used to adjust the gain, depending on system parameters. For example, for satellite communications, typically only the main tap of the equalizer will be required, while for cable modem transmissions, more than just a main tap may be needed. Also, there are a number of mathematical functions that can take into account the energy in all the equalizer taps, for example, sum of squares.

FIG. 14 illustrates the concept of correcting the gain versus carrier frequency error. As the table of FIG. 14 illustrates, the parameter estimator 320 can look up the estimated correction factor based on the frequency error while it is tracking data, and adjust gain accordingly. The fine gain tracking may be performed on the entire payload of the burst, or on a subset of the payload.

It will be appreciated that the various inventions described herein and in U.S. Provisional Patent Application No. 60/296,450, filed on Jun. 8, 2001, entitled "ROBUST BURST DETECTION ACQUISITION SYSTEM AND METHOD," U.S. Provisional Patent Application No. 60/296,455, filed on Jun. 8, 2001, entitled "RECEIVER HAVING INTEGRATED SPECTRAL ANALYSIS CAPABILITY," and U.S. patent application Ser. No. 09/430,821, filed on Oct. 29, 1999, all of which are incorporated herein by reference, may be combined in various ways in a single system.

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method of receiving data in a shared channel communications system comprising the steps of:
   receiving a burst that includes a burst preamble and a payload;
   performing a carrier frequency estimate and a gain estimate based on the preamble;
   tracking the burst with an equalizer;
   adjusting the gain estimate based on at least a main tap coefficient of the equalizer, wherein the equalizer uses at least a portion of the payload to derive the main tap coefficient; and
   extracting symbols from the data.

2. The method of claim 1, wherein, in said adjusting step, the equalizer uses an entire payload to derive the main tap coefficient.

3. The method of claim 1, wherein, in said adjusting step, the gain estimate is adjusted based on a plurality of taps of the equalizer.

4. The method of claim 1, further including the step of estimating channel SNR based on the burst preamble.

5. The method of claim 1, further including the step of estimating carrier phase based on the burst preamble.

6. The method of claim 1, further including a correcting step wherein said correcting step uses a lookup table to look up a correction factor based on a frequency error.

7. The method of claim 1, wherein the burst preamble includes a CAZAC sequence and a cyclic continuation prior to the CAZAC sequence.

8. The method of claim 7, wherein the burst preamble includes a second cyclic continuation after the CAZAC sequence.

9. The method of claim 1, wherein the burst preamble includes two back-to-back zero autocorrelation sequences, and
   a first cyclic continuation that includes two symbols prior to the two back-to-back zero autocorrelation sequences, and
   a second cyclic continuation that includes two symbols after the two back-to-back zero autocorrelation sequences.

10. The method of claim 1, wherein the burst preamble includes three back-to-back zero autocorrelation sequences, and
    a first cyclic continuation that includes two symbols prior to the three back-to-back zero autocorrelation sequences, and
    a second cyclic continuation that includes two symbols after the three back-to-back zero autocorrelation sequences.

11. The method of claim 1, wherein the burst includes at least one additional CAZAC sequence outside the preamble.

12. The method of claim 1, further including the step of filtering the burst using a pre-filter.

13. The method of claim 1, further including the step of adjusting a gain based on a main equalizer tap coefficient during said extracting step.

14. A method of extracting data from a burst in a shared channel communications system comprising the steps of:
    receiving a burst including a burst preamble and data, the burst preamble including a zero autocorrelation sequence and at least one cyclic continuation adjacent to the zero autocorrelation sequence;
    performing a carrier frequency estimate based on a correlation vector of the burst preamble and a local replica of the zero autocorrelation sequence; and
    extracting data from the burst based on the carrier frequency estimate.

15. The method of claim 14, wherein the zero autocorrelation sequence is phase adjusted prior to said performing step.

16. The method of claim 14, further including the step of gain correction based on the carrier frequency estimate.

17. The method of claim 14, further including the step of looking up a correction factor in a table based on an error of the frequency estimate in said performing step.

18. The method of claim 14, further including the step of pre-scaling the local replica.

19. A system for receiving communications over a shared communications channel comprising:
    a filter that receives a digital signal from the shared communications channel and outputs a sampled signal;
    a preamble correlator that correlates the sampled signal with a local replica of a preamble to generate a correlation vector and a Start of Packet signal;
    a parameter estimator that receives the correlation vector and the Start of Packet signal from the preamble correlator and outputs a coarse frequency estimate, an estimated gain, an estimated carrier phase and a symbol timing estimate;
    a first derotator that receives the sampled signal from the filter and outputs a first derotated signal;
    a buffer that receives the first derotated signal and outputs a buffered first derotated signal to the parameter estimator;
    a second derotator that receives the buffered first derotated signal multiplied by the estimated gain, and outputs a second derotated signal;
    a symbol timing subsystem that receives the timing estimate and the second derotated signal and outputs timed symbol samples;
    a feed forward equalizer that receives the timed symbol samples and outputs forward equalized samples;
    a tracking loop, including a third derotator, that receives forward equalized samples and outputs phase adjusted symbol samples whose phase is adjusted by the third derotator; and
    a decision feedback equalizer that receives the phase adjusted symbol samples and outputs equalized samples.

20. The system of claim 19, wherein a derivative of the sampled signal includes a zero autocorrelation sequence.

21. The system of claim 19, wherein the zero autocorrelation sequence is a CAZAC sequence.

22. The system of claim 19, wherein the decision feedback equalizer adjusts a gain of the data based on a main equalizer tap of the feed forward equalizer.

23. The system of claim 19, wherein the parameter estimator subsystem compares phases of two consecutive correlation vectors corresponding to zero autocorrelation sequences to generate the fine carrier frequency estimate.

* * * * *